Patented Jan. 30, 1940

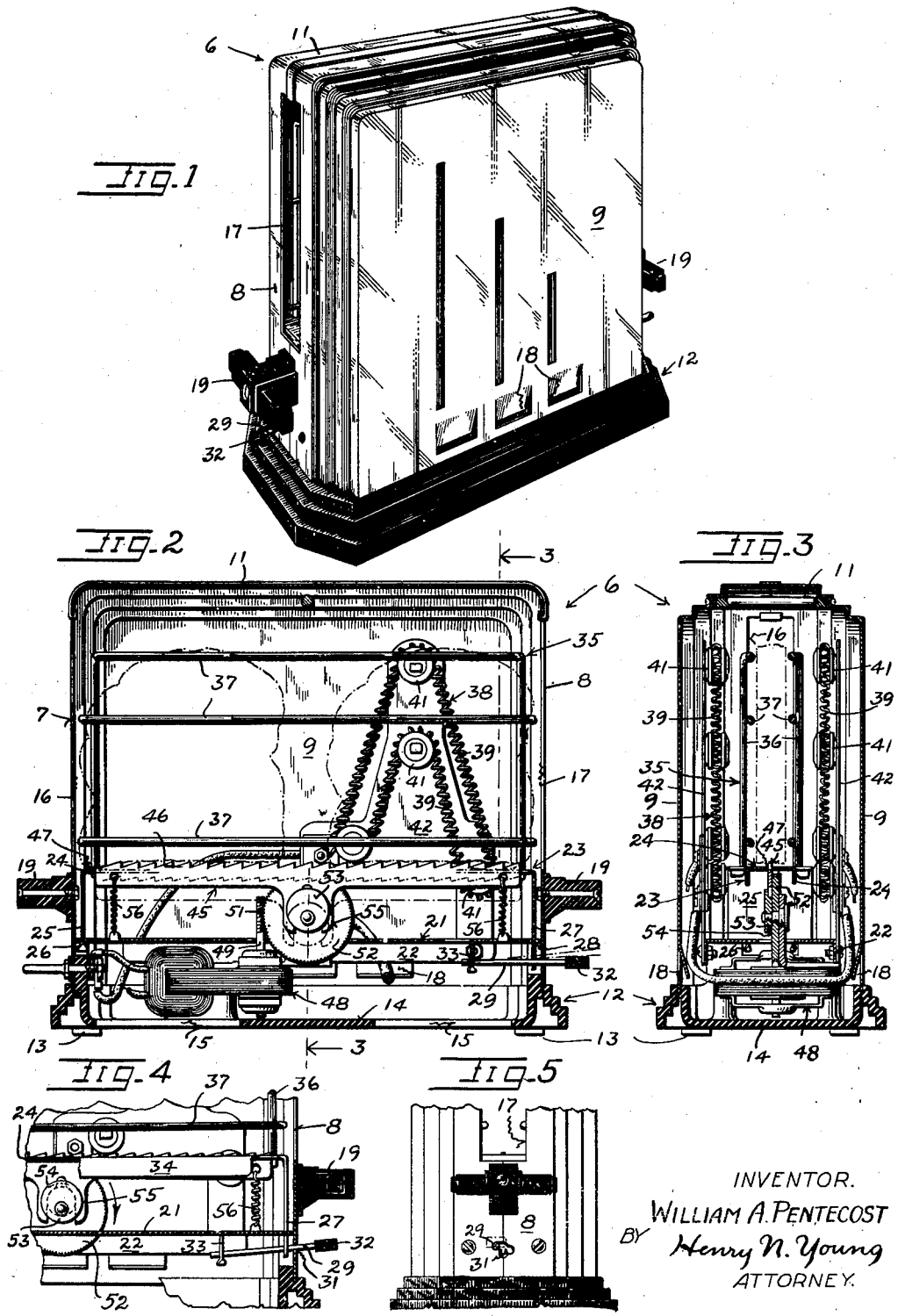

2,188,309

UNITED STATES PATENT OFFICE 2,188,309

TOASTER

William A. Pentecost, Oakland, Calif., assignor, by mesne assignments, to Toast-O-Lator Co. Inc., New York, N. Y., a corporation of New York Application March 8, 1934, Serial No. 714,549

5 Claims. (Cl. 219—19)

The invention relates to a continuously operable toaster unit wherein a slice of bread or the like is fed progressively through a heated zone for the toasting of the slice therein.

A general object of the invention is to provide an improved and particularly simple motor drive device for feeding a bread slice through a toaster of the class described.

Another object is to provide means for varying the toasting period for a bread slice passing through the toasting zone entirely independently of the operation of the feed device whereby the latter may be operated at a constant speed at all times.

A further object is to provide in the toaster unit a zone in which a preliminary heating and drying of a bread slice may be effected as the slice is advanced toward the toasting zone, said pre-heating zone utilizing a portion of the supplied heat which would otherwise be wasted and thereby minimizing the amount of heat which must be supplied to the toaster.

Yet another object is to provide for an even distribution of the heat in the toasting zone and at the side faces of a bread slice therein whereby to effect an even toasting of said slice faces.

The invention possesses other objects and features of advantage, some of which, with the foregoing, will be set forth or be apparent in the following description of a preferred embodiment of the toaster, and in the accompanying drawing, in which, Figure 1 is a perspective view of a toaster unit embodying the features of present invention.

Figure 2 is a longitudinal vertical section through the toaster.

Figure 3 is a transverse vertical section at the broken line 3—3 in Figure 2.

Figure 4 is a fragmentary section at 4—4 in Figure 3, operative parts of the mechanism being shown in different relation than in Figure 2.

Figure 5 is a fragmentary end view of the exterior of the toaster unit.

As particularly illustrated, the various operative elements of a toaster 6 embodying the present invention are provided in an elongated and generally rectangular casing having end walls 7 and 8, side walls 9, and a top wall 11. The casing is supported on a base 12 which engages the lower edge portions of the walls 7 and 8 and is preferably formed of a material which is nonconductive to both heat and electricity, has supporting feet 13, and provides a plate 14 as a bottom closure for the casing cavity, said plate having openings 15 therethrough for rendering certain elements of the toaster assembly accessible from beneath.

Inlet and discharge openings 16 and 17 are provided in upper parts of the casing walls 7 and 8 respectively, said openings being rectangular and of like size to provide for the free passage of a slice of bread therethrough with the slice disposed in a vertical plane. The top casing wall 11 is imperforate, and the side walls 9 are provided with louvered air inlet openings 18 adjacent their bottom portions and are otherwise imperforate. The present embodiment of the toaster is designed as a portable household unit and is accordingly provided with handles 19 which are shown as mounted on the casing ends 7 and 8 beneath the openings 16 and 17.

As a support means for various operative elements of the toaster, a planar member 21 is mounted in the casing in horizontal disposition, and in a plane intermediate the base plate and the plane defined by the bottom lines of the openings 16 and 17. As particularly illustrated, the member 21 is fixedly secured to and between the casing end walls 7 and 8, is laterally spaced from the side walls 9, and is provided with downturned side flange portions 22 for stiffening it longitudinally.

A member 23 extends longitudinally through the casing cavity in general alignment with the bottom lines of the openings 16 and 17, said member including an elongated plate portion 24 which is arranged to underlie and slidably support a slice of bread as the latter is advanced through the toaster. At the end thereof nearest the inlet opening 16, the member 23 is provided with a downturned extension 25 which is integral with the plate 24 and has its lower end supportedly engaged on the top face of the plate 21.

One or more tongues 26 depend from the bearing edge of the extension 25 and loosely engage through complementary slits in the plate 21 whereby the member 23 is hingedly related to the plate 21 at the bearing edge of the extension to permit a limited swinging of the member 23 about the fixed axis of hinging thus provided. As illustrated, each tongue 26 is twisted below the plate 21 to maintain the hinged connection of the member 23 with the plate 21. It will be understood that, while the present hinged mounting for the member 23 has the merit of extreme simplicity, some other suitable arrangement might be used for the purpose of hingedly connecting the member 23 to the plate 21. A tongue-like extension 27 depends integrally from the end of the plate 24 nearest the discharge opening 17 and extends in guided relation through a perforation 28 provided in the plate 21. At its lower end the extension 27 is provided with a perforation through which a rod 29 freely extends. The rod 29 is disposed generally longitudinally of the toaster, extends through and from an opening 31 provided in the casing end wall 9, and is provided with a knob 32 at its protruding end.

At its inner end, the rod 29 is pivoted to a hanger element 33 which depends from the plate 21; as shown, the hanger 33 comprises a strap-like portion of the plate which is bent downwardly at a point of the plate intermediate its sides and remains integrally attached at its upper end. By reason of its bearing in the opening 31 and the hanger 33 and its engagement through the extension 27, the rod 29 is operative to complete the support of the member 23 from the plate 21.

For a reason to be hereinafter brought out, the member 23 is arranged to be swung to and held in a plurality of adjusted positions whereby the end of its plate portion 24 adjacent the casing 8 may be disposed at different distances from the plate 21. Accordingly, and as shown in Figure 5, the opening 31 is provided with a plurality of upwardly directed notches in its sides and at different levels whereby the outer rod end portion may be variably supported and corresponding settings of the member 23 may thus be made; as particularly shown, two notches are provided in the sides of the opening 31 whereby three different settings of the rod and member are permitted.

Intermediate its length and at opposite sides thereof, edge portions 34 of the plate 24 are turned down to narrow the plate thereat and at the same time provide a stiffening means for the plate. The plate 24 carries guide frames 35 which extend upwardly at opposite sides thereof to define a guideway between them for retaining a slice of bread in upright position as it is moved along the plate 24. As particularly illustrated, posts 36 extend upwardly from the plate 24 at the corners thereof, and the posts at a given side of the plate are connected by means of bars 37 which extend longitudinally of the plate and are disposed at the inner sides of the posts which mount them. The posts 36 and bars 37 may be of wire or the like.

It will now be noted that the casing space above the plate 24 is arranged to provide both pre-heating and toasting zones in different portions thereof, and to this end the length of the casing is preferably made at least twice the width of an ordinary slice of bread and may be greater. The heating elements 38 of the toaster are no wider than an ordinary bread slice and are mounted in the casing adjacent the discharge opening 8 and between the guide frames 35 and the different casing walls 9. As shown, the heating elements 38 each comprise an electric heating coil 39 carried by and between a series of spools 41 of insulation material which are mounted on an upright support plate 42 and dispose the coil portions in a common plane. As shown, the plates 42 are fixed to the depending flanges 22 of the support plate 21 as a mounting means therefor.

Preferably, and as shown, each heating element 38 has the outline of an isosceles triangle with the base of its triangle horizontal and disposed generally at the plane of the plate 24. With the present form of heating element, the toasting of the face of a bread slice fed through the toaster and past the element is found to be even over the face; with a rectangular element in the same situation, the top portion of the face of a bread slice would be toasted more than the bottom portion, the effect largely resulting from the convection current of heated air which is set up between the bread slice and the element.

An element 45 is provided for effecting a controlled forward movement of a slice of bread through the described guideway of the member 23 for preheating and toasting in the appropriate zones of the casing space. As particularly shown, the element 45 comprises an elongated plate having a serrated top edge portion 46 which is arranged for periodic protrusion through a slot 47 which extends centrally and longitudinally through the plate 24 of the member 23. The element 45 is arranged for a bodily and circular movement in its plane while its serrated edge portion 46 is retained in fixed angular relation to the plate 21, and protrudes upwardly from the plate 24 only while it is moving through an upper part of its circle of movement and toward the discharge opening 8.

With the described arrangement, a slice of bread in the guideway is intermittently engaged and moved forwardly on and with the element 45 while the latter extends above the plate 24, the amount of forward movement of the bread slice in the guideway being determined by the forward movement of the element while it engages with and beneath the slice. With the element 45 moving in a fixed locus, it will be understood that the forward movement of the bread slice in the guideway may be varied by adjusting the position of the plate 24 through selectively setting the rod 29 in the different seats provided in the opening 31; thus, if the plate 24 is raised from a given position, each forward movement of a bread slice in the guideway will thereafter be shortened, whereby a longer toasting time will be given for the bread slice as it is fed past the heating elements 38 at the toasting zone. It will be noted that the adjusting rod 29 is shown in lower and upper settings thereof in Figures 2 and 4 respectively, and that the knob 29 is provided on the rod to facilitate its manipulation.

As particularly illustrated, a constant speed rotary electric motor 48 is provided for effecting the aforesaid feeding movement of the element 45, said motor including a shaft 49 carrying a worm 51 which operatively engages a gear wheel 52 to drive the latter at a somewhat lower rotative speed than that of the shaft. A circular disc member 53 is eccentrically fixed on a face of the gear 52, said member having portions of different diameters with its portion of least diameter adjacent the gear whereby the gear and the portion of the member of greatest diameter are cooperative to define a groove 54 which is eccentric to the axis of rotation of the gear. As shown, the motor 48 is supported on the base plate 14, and the plate 21 is suitably perforated to permit the extension of the described gearing assembly therethrough.

A forked extension 55 depends integrally and intermediately from the element 45 in the plane thereof and engages in the groove 54 in the manner of an eccentric strap for both supporting the element 45 and for effecting the described feeding movement thereof as the gear 52 is rotated. For maintaining the element 45 in fixed angular relation to the plate 21, tension springs 56 connect the extremities of the element with the plate 21; when, as shown, the springs 56 are operative at equal distances from the center of the notch of the extension 55, these springs would be of equal strength and length whereby the desired positioning of the element 45 is maintained as it undergoes its described bodily movement in a circle as a slice propelling means.

When the motor 48 is operating at its intended fixed speed and the member 23 is in its lowest set position which is illustrated in Figure 2, the operative relation of the parts of the feed means is such that a slice of bread will be carried through the preheating and toasting zones of the present toaster structure in about one and one-half minutes, this being a minimum toasting time for the toaster. Other settings of the member 23 will lengthen the time for effecting a toasting of the bread, it being noted that moisture and other conditions of the bread, as well as the degree of toasting desired, are all factors which enter into the setting which is used for the member 23.

By reason of the fact that the inlet and discharge openings 16 and 17 respectively are the only points at which the escape of heated air is permitted from the toaster casing, and the provision of the preheating zone ahead of the toasting zone, the present toaster has been found particularly efficient in the use of the heat energy derived from the heating element 38. In fact, where usual toasters which are designed to simultaneously toast bread slices on two sides thereof consume about 600 watts of electrical energy per hour, the present toaster requires but 475 watts.

From the foregoing description taken in connection with the accompanying drawing, the advantages of the construction and method of operation will be readily understood by those skilled in the art to which the invention appertains. While I have described the features and the principle of operation of a device which I now consider to be a preferred embodiment of my invention, I desire to have it understood that the showing is primarily illustrative, and that such changes may be made as fall within the scope of the following claims.

I claim:

1. A bread toaster comprising upright and mutually spaced and opposed heating elements, a fixedly disposed plate arranged for supporting engagement with and beneath an edge of a slice of bread to be toasted and provided with a rectilinear slot extending longitudinally therein, a feeding element for intermittent protrusion upwardly through said slot to engage said slice edge to advance the slice for predetermined distances along the plate and between the heating elements, said feeding element having a straight upper edge portion extending for substantially the full length of the plate slot, means mounting said feeding element for movement in an upright circular path while said upper edge portion thereof is maintained in fixed angular relation to said plate, motor means to continuously effect the said circular movement of the feed element whereby said upper edge portion of the element is arranged to operatively extend above said plate for a portion of each rotative cycle of the element to supportingly engage and simultaneously advance the slice through the toaster, and means adjustable to vary the amount of operative protrusion of the feeding element above the support plate.

2. In a toaster, a heating element, and means to support a slice of material to be toasted on edge and for movement in its plane in a path past said heating element for effecting the toasting of the slice, a plate member disposed beneath the bottom edge of the slice in the line of movement thereof and as a support means for the slice, a feeding element for intermittent protrusion upwardly of said plate and having a straight upper edge arranged to engage with and beneath said slice while the element protrudes above the plate, means mounting said element for movement in an upright and fixed circular path while said upper edge thereof is maintained in fixed angular relation to said plate, means mounting said plate member for vertical adjustment whereby to adjustably vary the maximum amount of operative protrusion of the feeding element above the plate at each cycle of rotation of the element, and motor means continuously operative to effect the said circular movement of the feed element at a constant speed independently of the adjusted setting of the plate.

3. In a bread toaster, means forming a narrow vertical passageway open at its ends, said means including a way upon which the bread travels on edge and guides for maintaining the bread in erect position, said way having a slot therein, a feed mechanism including a feed bar having dogs thereon adapted to extend through the slot and to engage the bread on said way, means for giving the feed bar a circular parallel movement to cause the dogs to travel upwardly toward the bread, along the slot and away from the bread and back again to original position, means for varying the distance of travel of the feed bar into and out of the slot, and means for toasting the bread during its passage through the passageway.

4. A toaster comprising an elongated casing providing a cooking zone, an adjustably fixed support member arranged to directly engage an edge of a mass of toastable material in the casing to normally support the mass, a feeding element for intermittent operation in a fixed zone of action and directly against the mass at said edge to engage and support the mass alternately with the support member while advancing the mass through the cooking zone, and means to adjust the disposal of the support member with respect to the zone of action of the feeding element for varying the effective working stroke of the latter.

5. Bread toasting apparatus comprising a pair of heating elements spaced to form a toasting passage through which a slice of bread may be passed to be toasted, supporting means for said slice at the bottom of said passage, recurrently acting means cyclically to lift a slice of bread from said supporting means, advance it and replace it on said support in its advanced position, and means to adjust the length of said movement of advancement for each cycle.

WILLIAM A. PENTECOST.